(12) United States Patent
Nicoll et al.

(10) Patent No.: US 7,783,570 B2
(45) Date of Patent: Aug. 24, 2010

(54) CASH TRANSACTION VERIFICATION AND CREDITING APPARATUS

(75) Inventors: Kenneth A. Nicoll, Dundee (GB); Mark M. Grossi, Dundee (GB); Grant C. Paton, Dundee (GB); Wolf D. Rossman, Angus (DE); Alfred J. Hutcheon, Alpharetta, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 11/710,884

(22) Filed: Feb. 26, 2007

(65) Prior Publication Data

US 2007/0174190 A1    Jul. 26, 2007

Related U.S. Application Data

(63) Continuation of application No. 09/337,096, filed on Jun. 21, 1999, now Pat. No. 7,206,759.

(30) Foreign Application Priority Data

Jul. 4, 1998    (GB) ................... 9814451.2

(51) Int. Cl.
    *G06K 40/00* (2006.01)
(52) U.S. Cl. ............... 705/43; 705/40; 705/44; 235/379
(58) Field of Classification Search ............. 705/35–45
    See application file for complete search history.

(56) References Cited

U.S. PATENT DOCUMENTS

| 4,359,631 A | 11/1982 | Lockwood et al. |
| 5,183,142 A | 2/1993 | Latchinian et al. |
| 5,616,902 A | 4/1997 | Cooley et al. |

FOREIGN PATENT DOCUMENTS

| WO | WO 96/08797 A1 | 3/1996 |
| WO | WO 98/59308 | 12/1998 |

(Continued)

OTHER PUBLICATIONS

Popularity of ATMs Ready to Explode Banks' craving for latest technology combined with an untapped self-servicemarket creates a potential financial goldmine John Racine. American Banker (pre-1997 Fulltext). New York, N.Y.: Jun. 21, 1995. vol. 160, Iss. 118; p. 6.A.*

(Continued)

*Primary Examiner*—Richard C Weisberger
(74) *Attorney, Agent, or Firm*—Michael Chan, Esq.

(57) ABSTRACT

To enable the payment of charges, for example those for mobile telephones, with cash there is provided an automated terminal for receiving payments including an input for currency notes, an acceptor for such currency notes and an input for information on an account for charges to which payment is required together with a control arrangement to record said account information and the value of acceptable currency notes fed in, to relate said information to said value as payment to said account and to hold said related information and value and acceptable currency notes available for retrieval. In this way a user need not have a bank account to make a payment to an account with a service provider.

4 Claims, 3 Drawing Sheets

FOREIGN PATENT DOCUMENTS

ZA                94/10321          12/1994

OTHER PUBLICATIONS

Billers Benefit when the bill's not in the mail, Bank Network News, V15, N8, p. 4-5, Sep. 11, 1996.

Anonymous, "Bill Payment Transfer System", IBM Technical Disclosure Bulletin, IBM Corp, New York, US, vol. 19, No. 5, Oct. 1, 1976.

Jackel et al., "Optical Character Recognition for Self-Service Banking", AT&T Technical Journal, American Telephone and Telegraph Co., New York, US, vol. 74, No. 4, Jul. 1, 1995.

* cited by examiner

CASH TRANSACTION VERIFICATION AND CREDITING APPARATUS

CROSS REFERENCE TO RELATED APPLICATIONS

This application is a continuation application of U.S. patent application Ser. No. 09/337,096, filed Jun. 21, 1999 now U.S. Pat. No. 7,206,759.

BACKGROUND OF THE INVENTION

The present invention relates to apparatus to receive cash, verify its genuineness and value and report the value to associated apparatus.

For some years machines known as Automated Teller Machines (ATM) have been available for use by those having bank accounts to provide some of the services hitherto performed by human tellers at bank counters. For example such machines can be used by a person having a bank account to receive currency notes and credit the value of such notes to the account. Furthermore such machines can be placed other than at a bank building and can provide a twenty-four hour service if required. However if a person not having a bank account wishes to pay cash into a bank for any purpose the transaction can only be carried out with a human teller at a bank counter when the bank is open. The success of the ATM has reduced the need for a large number of bank branches and therefore restricted the opportunity to pay cash into a bank. Also other changes make many transactions hitherto carried out with cash more difficult. For example public utilities no longer have the numerous offices, shops or showrooms where their charges for services could be settled by cash payment. Particularly if a person is unable to have a bank account or facility for producing a cheque for payment of such a charge by post or via document deposit in an ATM such a person can be seriously inconvenienced or disadvantaged in meeting such a charge. Similar inconvenience or disadvantage is experienced by a person who, for legitimate personal reasons, does not want a bank account.

SUMMARY OF THE INVENTION

It is an object of the present invention to remove this inconvenience and disadvantage by providing apparatus, system and method which permits the use of cash to pay charges for services provided or to be provided without the need to attend at a bank counter or other office and involve a human teller.

According to the invention an automated terminal for receiving payments including an input for currency notes, an acceptor for such currency notes and an input device, characterized by a control arrangement arranged to record information corresponding to an account for charges by a service provider and to the value of acceptable currency notes fed in, the terminal being at least intermittently connectable to a remote information handling arrangement holding said account for charges.

The terminal may be arranged to receive payments for a mobile telephone service and include an output to supply payment related information to a service provider of a mobile telephone network. The payment related information may cause the service provider to perform at least one of reducing the balance due on a credit payment account and increasing the calls available on a prepayment account.

Another aspect of the invention provides a method of paying charges for a mobile telephone service including providing an automated terminal to receive currency notes and details of a specific mobile telephone account and to relate acceptable currency note value with the specific account, inserting currency notes and specific account details into said terminal and causing or permitting said terminal to at least intermittently supply said related value and account details to a service provider.

A further aspect of the invention provides a payment system for cash payments to meet a charge on an account of a provider of goods or services including an automated terminal to receive currency notes and details of the account, the terminal including a note acceptor and an input for account details and means to relate and retain accepted currency value and account details together with means to supply said related value and details at least intermittently to said provider to inform of the payment towards the account charges, the terminal also including a secure store for accepted currency notes.

BRIEF DESCRIPTION OF THE DRAWINGS

Embodiments of the invention will now be described by way of example with reference to the accompanying drawings, in which.

DETAILED DESCRIPTION

Figure 1:
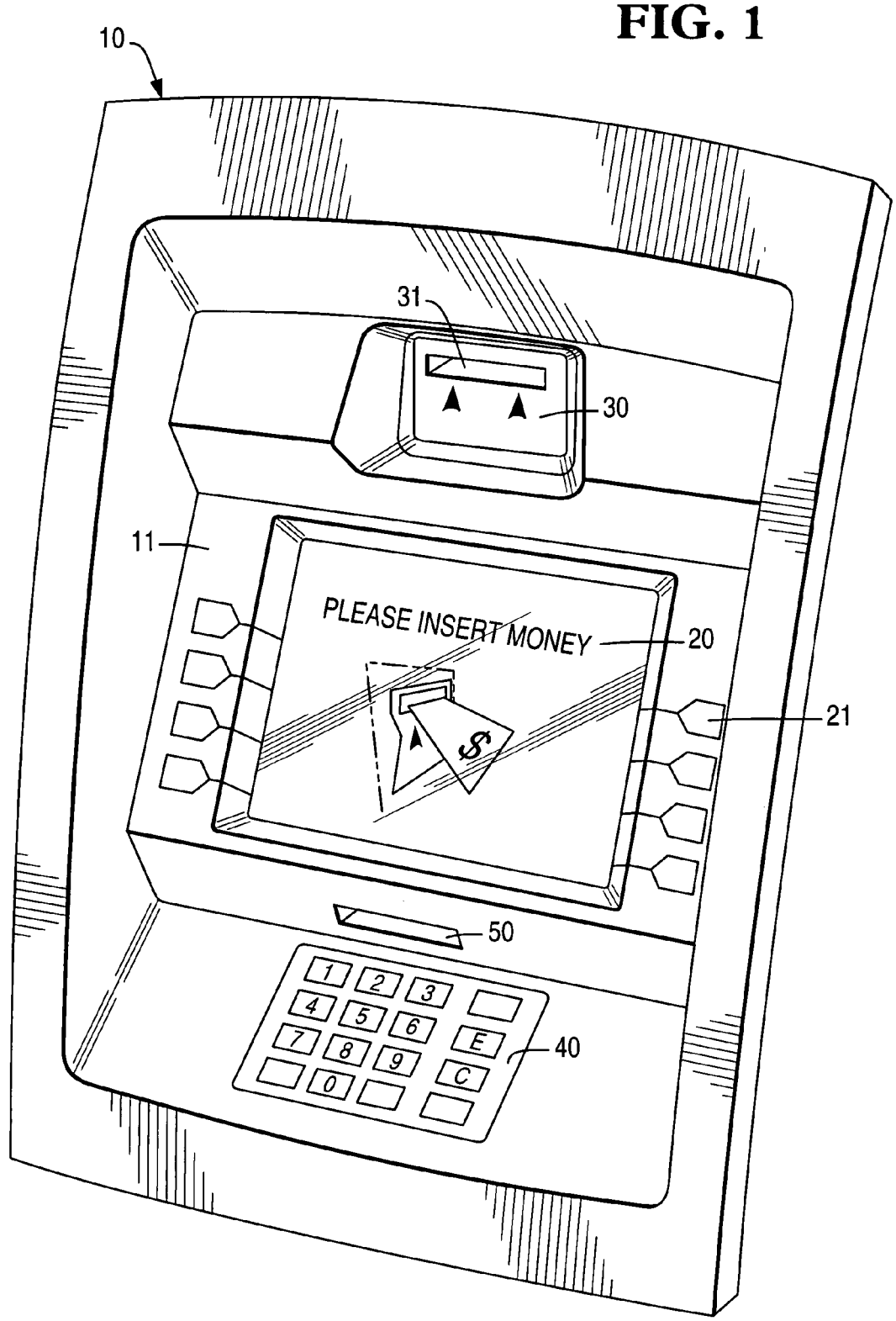
FIG. 1 is an external perspective view of an automated terminal for self-service cash transactions such as payment of charges due and embodying the invention.

Referring to FIG. 1 this shows the front of a cash transaction terminal, indicated generally at 10, and having a user panel 11 including a display screen 20 with instruction keys 21 and a cash insertion point 30 having a slot 31 for the insertion of currency notes into a note acceptor. The user panel also includes a keypad 40, which may be alphanumeric, for the entry of user information and including enter and cancel keys in conventional manner. There may be a slot 50 from which a printed record or receipt for the transaction is supplied by printer 51, not shown in FIG. 1. There may be a slot, not shown, for returning unaccepted notes or these may be rejected via the insertion slot 31. A card reader 41, not shown in FIG. 1, may be provided for cards of the conventional credit card form. The terminal in operation is installed in the wall of a building or other secure structure so that the terminal is protected from unauthorized access while permitting authorized access for servicing and retrieval of notes from a secure store for accepted notes.

Figure 2:
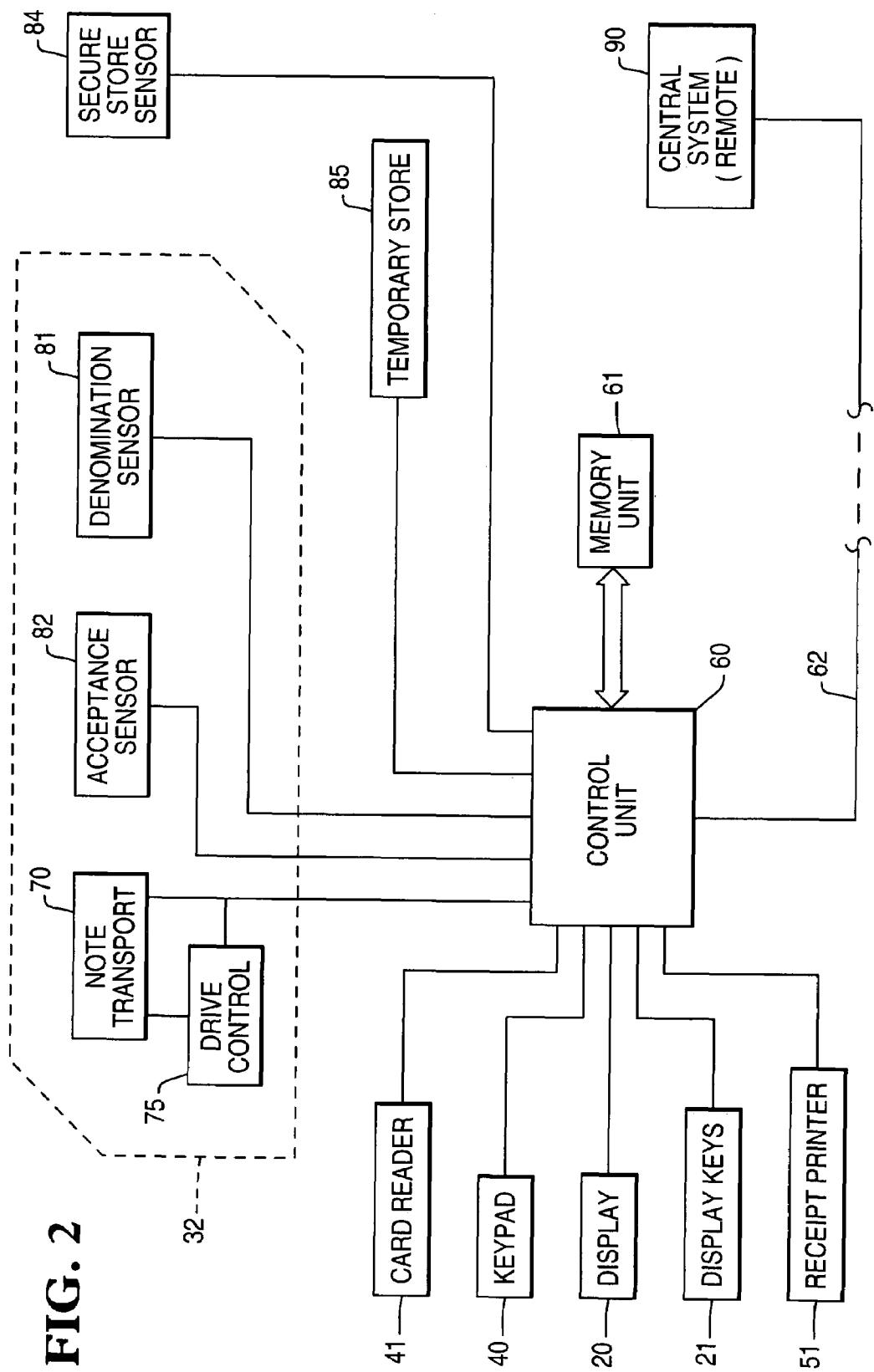
FIG. 2 is a block schematic diagram of the terminal of FIG. 1.

FIG. 2 is a block diagram of the component parts of the terminal of FIG. 1 with the same parts designated by the same reference numerals and shows the interconnection of these parts with those described below.

One mode of operation of the terminal will now be outlined as an example of the invention with reference to FIGS. 1 and 2. When the terminal is quiescent the screen 20 displays a welcome message and an invitation to select the service required, usually by operating one of the keys 21. One of the services will be "credit specific account with cash" or a similar phrase. A user now approaches the terminal. This user has a mobile telephone and has received a bill from the telephone service provider on the account of charges for calls made on the telephone. This user wishes to pay this bill using cash, for reasons dealt with below. The user requests the service "credit specific account with cash" by operating the appropriate one of the keys 21. A control means in the terminal responds to the key and the display changes to "key-in account number" and the user does this with keypad 40. The number keyed-in is recorded in the terminal, for example in memory unit 61 in FIG. 2, and may also be transmitted then or at a later time to one or more other places indicated at 90 in FIG. 2, such as the computer system of the telephone provider, by the action of the control means 60 and using the connection indicated at 62, which may be a line or wireless link. If the number is acceptable to the terminal the display will change again to "insert cash". Acceptability of the number can be determined in various ways such as parity checks, checking with a list held in the terminal or by on-line check with a centrally-held record. The user now inserts currency notes one-by-one into slot 31. Each note is transported into the note acceptor 32 in the terminal and there checked for validity, acceptability and denomination and acceptable notes are transported in the terminal to a secure store (not shown). The value of acceptable notes for this user is recorded in the terminal. Any notes rejected on being checked are ejected from the terminal. When the user ceases to insert notes and recordal is complete a message "transaction complete? yes/no" is displayed. If the user operates the "yes" key the value of notes accepted is associated with the number keyed in by the user. A further message "receipt required? yes/no" may be displayed or a receipt provided on every transaction. When the terminal is connected permanently or intermittently to another system the transaction is recorded on the other system as well so that the record of the user's account shows that the bill was paid in cash at a particular terminal at a particular time and date. If there is no permanent or intermittent connection from the terminal the record of the transactions can be collected from the terminal from time to time by downloading to a suitable device for storage and subsequent transfer to a central system. Clearly any currency notes in the secure store are also removed from time to time. All the operations in the terminal are brought about by the control means.

Reference has been made above to a user of, say, a mobile telephone having reasons to pay a bill in cash. Several reasons are readily apparent. The user may not be able to have a bank account. The user may not have a cheque account on which a cheque can be drawn and sent to the telephone company. The user may not have an account from which a direct debit transfer is permitted. The user may not have any form of account and carry out all transactions in cash. There are parts of the world remote from banking facilities or where bank accounts are not widely used but where services such as mobile telephones are in wide use and payments cause problems for users.

The structure of the apparatus will now be considered in more detail. Some parts will be readily recognized by those familiar with an ATM. Thus the display 20 and keys 21 as well as keypad 40 can be those used in an ATM. A receipt printer 51 and delivery slot 50 if required can also be of ATM type. The parts associated with the insertion and the acceptance and value recordal of a currency note (frequently called a note acceptor) and the secure store for accepted notes are also known in the ATM art, although not found in every ATM, and will not be described further in detail, being shown only in schematic form.

Referring to the block schematic diagram of FIG. 2 the note acceptor 32 in this embodiment includes a currency note transport arrangement 70 extending from cash insertion slot 31 in the terminal, where a user places a currency note, and units for determining the acceptability (82) and denomination (81) of a currency note. There is also a secure store for acceptable currency notes. An electronic control unit 60 links, supplies any power required and controls the various parts of the apparatus. A drive control to supply any power required for the note transport 70 is indicated at 75 and this in turn is controlled by control unit 60 in response to the various signals received there from the other units. In operation the arrangement responds to the insertion of a currency note in slot 31 to detect the note, transport the note and determine the denomination and acceptability of the note. If the note is acceptable and of known denomination the note transport conveys the note to the secure store 83. If for any reason the note is unacceptable the control unit operates the note transport to return the note to the slot 31 from which it is ejected to be retrieved by the user of the terminal who inserted the note. Clearly similar action would be taken for a piece of paper or other spurious item. The secure store has a sensor 84 to detect when the store can not receive any more notes. Suitable electronic and electrical power arrangements are well-known and readily available.

If required a temporary store device 85 can be provided before the secure store. Acceptable notes are held in the temporary store until the "transaction complete?" question is answered "yes" when the store device is operated to move the notes to the secure store. If the question is answered "no" the option "return cash?" is offered and the notes can then be returned from the temporary store to the user either from slot 31 or other convenient outlet and the transaction canceled.

It must be noted that the above arrangement is given by way of example only as many different types of currency note exist with different systems of validity features and denomination distinction. Appropriate techniques exist and, in themselves, do not form part of the present invention being selected as required.

As mentioned above the value of the acceptable notes placed in the secure store is associated with the user's number and recorded for transfer to the person or organization related to this number and to whom the payment is due as meeting the payment to the extent of the cash accepted and retained in the store.

The above describes one form of transaction through the terminal and one arrangement of apparatus in the terminal to put the invention into effect.

Figure 3:
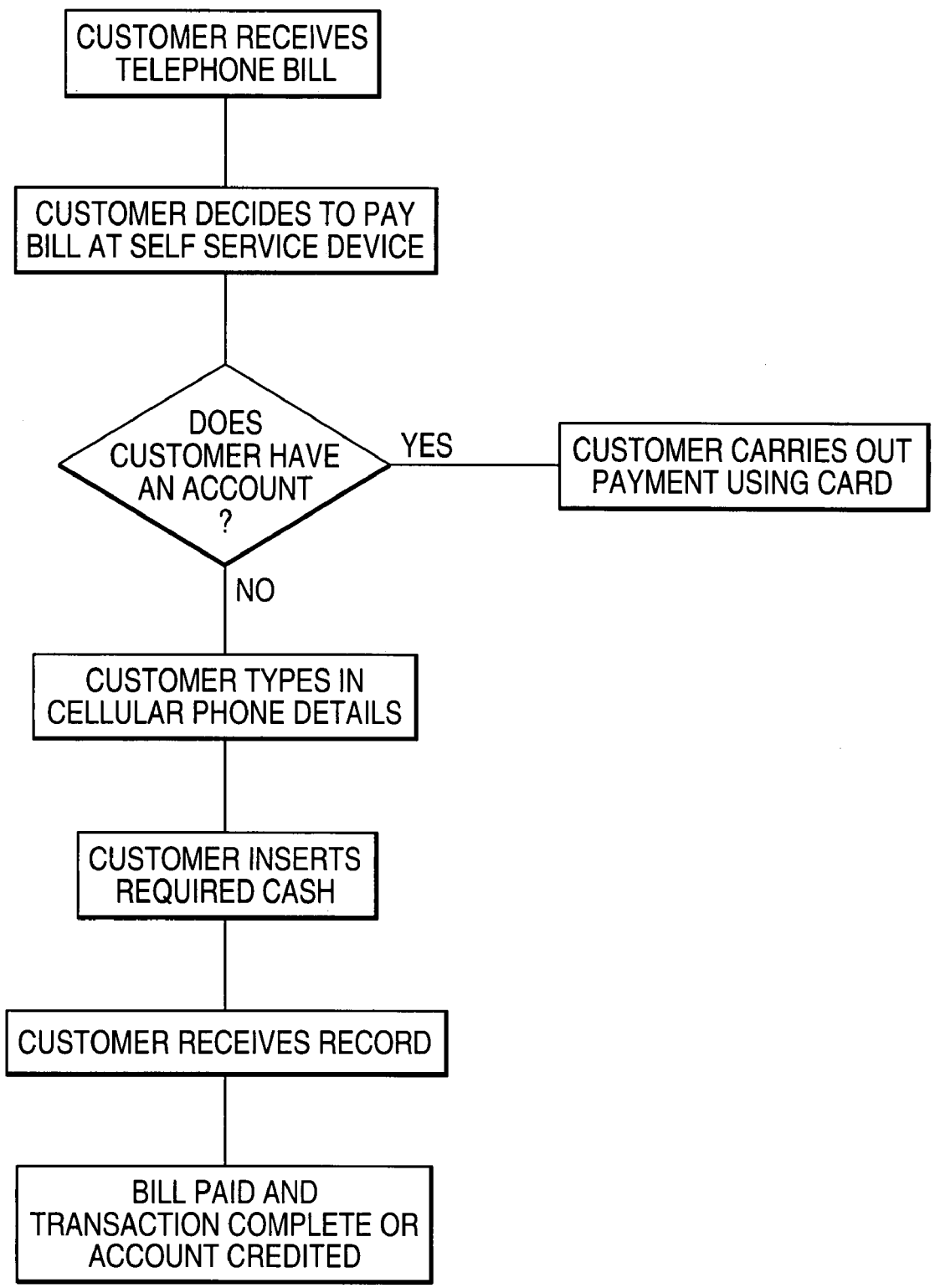
FIG. 3 is a flow diagram useful in understanding the invention and representing a cash payment operation of the terminal for cash payment of mobile (or cellular) telephone charges.

Clearly the invention provides for other forms of apparatus and transaction. The basic act of paying a bill on a numbered account with cash has been described. Other cash-based actions are possible. One is the use of a card carrying the account number, possibly in a concealed manner, instead of keying-in the account number by hand. In this case a suitable card reader as mentioned above is needed in the terminal. Where there is a card reader in a terminal a user could use a credit card or debit card to meet the charges, or even use cash and card together. The user would probably need to key-in a personal identification number (PIN) to authorize the card-based transaction but the terminal provides a keypad for this. FIG. 3 shows a flow diagram of the cash-based transaction outlined above.

Another cash-based transaction made possible by the invention is the use of the terminal to "top-up" a mobile telephone which only works if value has already been transferred to the service provider. The user of such a telephone would receive notice, probably via the telephone in some convenient manner such a message on the telephone display, that the pre-paid calls are almost exhausted. The user goes to a terminal embodying the invention and by keying-in or inserting a card informs the terminal of the identity of the telephone account. Cash can then be fed into the terminal to provide further pre-payment of calls. The amount may be chosen by the user or possibly set by the service provider. For this aspect of the invention the terminal would need to be continuously or frequently connected to the fulfillment center of the service provider so that the user can make immediate use of the calls now pre-paid.

The techniques described above permit a user of a mobile telephone to operate the telephone using only cash to meet the charges incurred by making or prepaying telephone calls. No purchase of intermediate tokens or other devices is needed, as has been proposed hitherto in the art, nor does the user have to have a bank account or like financial arrangement. The user does not have to visit a bank during restricted hours but can meet the charges on an account for services at any convenient time and place where there is a terminal.

The terminal has been described above as a stand-alone unit but it could be added to a conventional ATM, or adjacent to an ATM, to simplify communication and servicing.

The terminal has been specifically described in the context of mobile telephone charges but is equally appropriate to the payment of charges on any account where cash is acceptable. Thus charges by utilities such as suppliers of gas, water or electricity, by local authorities for property taxes or even hire purchase payments could be met by the use of a terminal according to the invention. The exact manner in which the value of cash accepted in a terminal is passed to the holder of the account is a matter for the operator of the terminal and may involve a handling charge but would in any case be more efficient and less costly than a transaction at a bank counter with a human teller.

What is claimed is:

1. A self-service terminal continuously or frequently connected to a remote system of a service provider who can credit cellular telephone time to cellular telephone account numbers of users and for enabling users to purchase additional pre-paid cellular telephone time from the service provider, the self-service terminal comprising:
   a screen arranged to display an invitation to allow the user to request purchase of pre-paid cellular telephone time;
   a user input device arranged to receive the request, wherein the request comprises a cellular telephone account number associated with the user;
   a card reader arranged to receive a card from the user to allow the user to effect an amount of payment for purchase of pre-paid cellular telephone time; and
   a controller programmed to (i) provide said screen, (ii) receive from the user input device the cellular telephone account number associated with the user, and (iii) communicate both the effected amount of payment and the received cellular telephone account number to the remote system of the service provider and thereby causing the remote system to credit an amount of additional pre-paid cellular telephone time to the cellular telephone account number based upon the amount of payment.

2. A self-service terminal according to claim 1, wherein the user input device comprises a keypad coupled to the controller and for allowing the user to enter the cellular telephone account number.

3. A self-service terminal continuously or frequently connected to a remote system of a service provider who can credit cellular telephone time to cellular telephone account numbers of users and for enabling users to purchase additional pre-paid cellular telephone time from the service provider, the self-service terminal comprising:
   a screen arranged to display an invitation to allow the user to request purchase of pre-paid cellular telephone time;
   a user input device arranged to receive the request, wherein the request comprises a cellular telephone account number associated with the user;
   a note acceptor arranged to receive banknotes from the user to allow the user to effect an amount of payment for purchase of pre-paid cellular telephone time; and
   a controller programmed to (i) provide said screen, (ii) receive from the user input device the cellular telephone account number associated with the user, and (iii) communicate both the effected amount of payment and the received cellular telephone account number to the remote system of the service provider and thereby causing the remote system to credit an amount of additional pre-paid cellular telephone time to the cellular telephone account number based upon the amount of payment.

4. A self-service terminal according to claim 3, wherein the user input device comprises a keypad coupled to the controller and for allowing the user to enter the cellular telephone account number.

* * * * *